Patented Dec. 29, 1925.

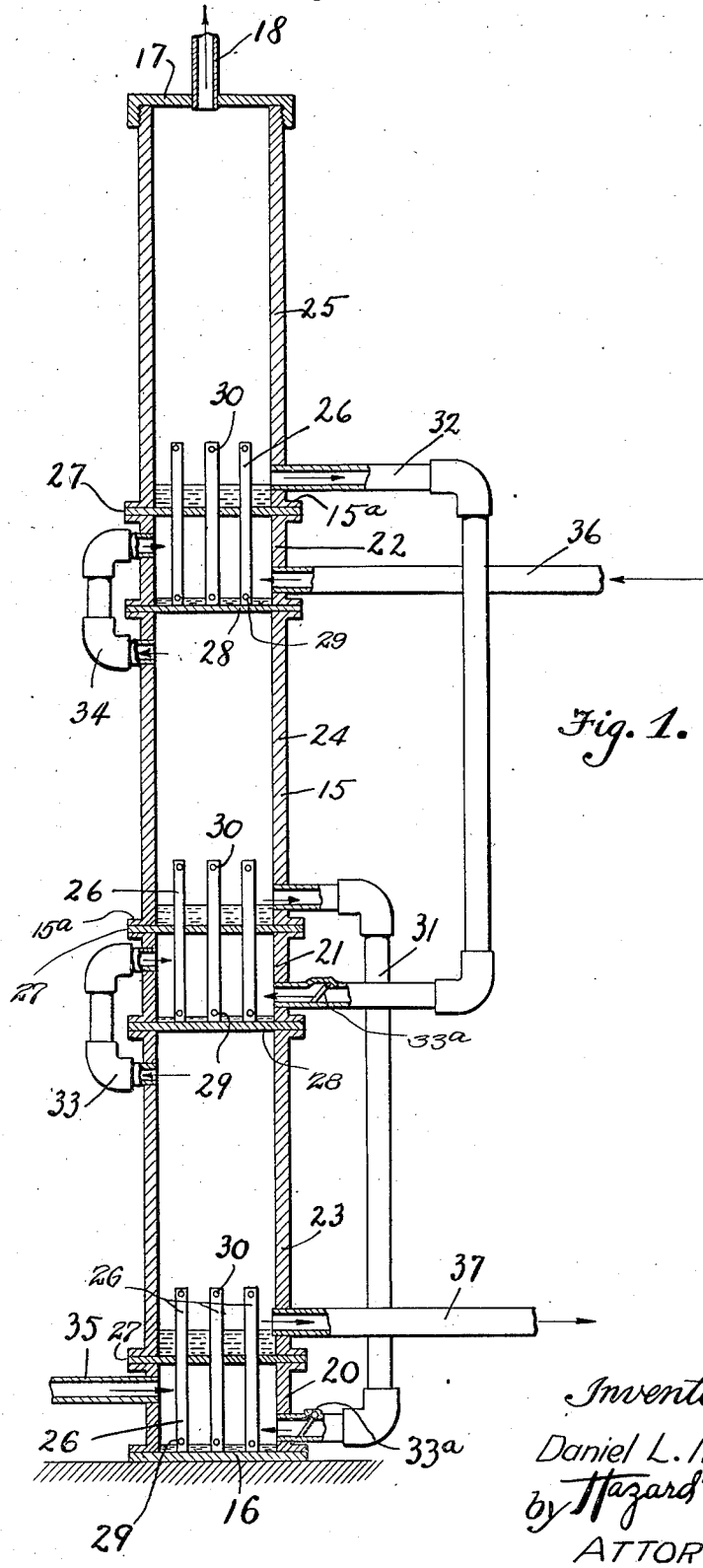

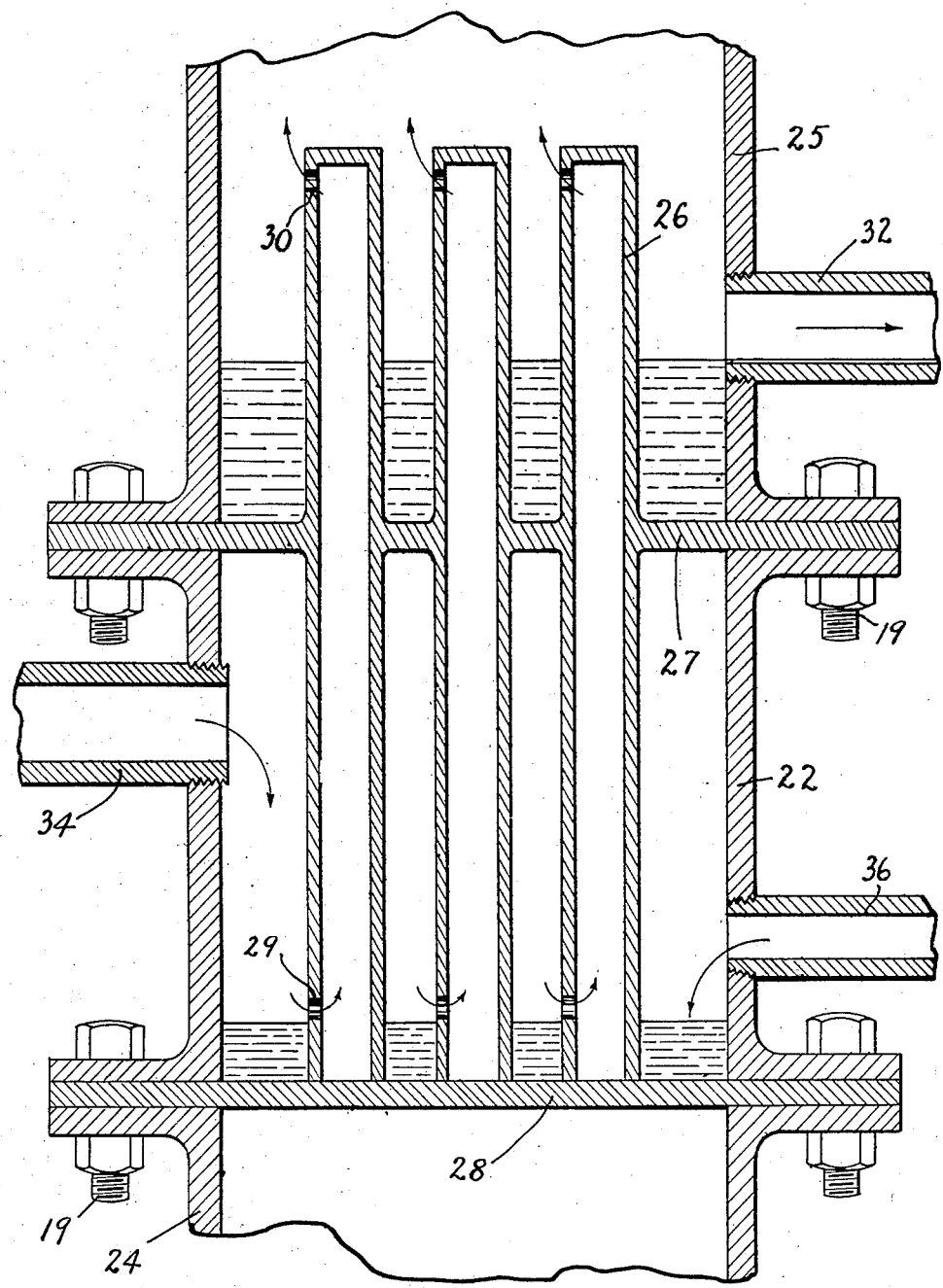

1,567,456

UNITED STATES PATENT OFFICE.

DANIEL L. NEWTON, OF FULLERTON, CALIFORNIA.

ABSORPTION TOWER.

Application filed August 7, 1922. Serial No. 580,270.

*To all whom it may concern:*

Be it known that I, DANIEL L. NEWTON, a citizen of the United States, residing at Fullerton, in the county of Orange and State of California, have invented new and useful Improvements in Absorption Towers, of which the following is a specification.

My invention relates generally to apparatus for effecting the recovery of certain vapors from gases, and more particularly, to apparatus employing the counter-current system of removing, by the process of absorption, gasoline vapors from natural gas.

It is an object of my invention to provide a recovering apparatus in the form of an absorption tower which is constructed to utilize the pressure of gas for removing the absorption agent.

Although I will describe only one form of absorption tower embodying my invention and point out the novel features thereof in claims, it is to be understood that various changes and modifications may be made without departing from the spirit of the invention and the spirit and scope of the claims.

In the accompanying drawings,

Figure 1 is a view showing in side elevation and partly in section one form of absorption tower embodying my invention;

Figure 2 is an enlarged vertical section of a portion of the tower shown in Figure 1.

Referring specifically to the drawings, in which similar reference characters refer to similar parts, my invention in its present embodiment comprises an elongated tank 15 of suitable length and diameter having its lower end closed by a wall 16 and its upper end by a cap 17 through which latter is extended a pipe 18 constituting a gas discharge for the tank. This tank is preferably made in compartments arranged in end to end formation and provided at their confronting ends with annular flanges 15ª which, as clearly shown in Figure 2, receive bolts 19 for securing the flanges to each other. In the present instance, I have shown the tank as comprising relatively short compartments 20, 21 and 22 and long compartments 23, 24 and 25.

Each short compartment 20, 21 and 22 contains a mixing unit and each mixing unit comprises in the present instance a plurality of pipes or tubular members designated at 26. These pipes are preferably cast integrally with a partition 27 of sufficient diameter so as to have its marginal edge interposed between the flanges 15ª of adjacent compartments so as to be engaged by the bolts 19 for securely retaining the partition in horizontal position. The pipes 26 are open at their lower ends but are adapted to be closed by a partition 28 interposed between the corresponding short compartment and the adjacent long compartment 23 or 24 and held in position between the flanges 15ª in a manner similar to the partition 27. Adjacent their lower ends, the pipes 26 are provided with inlet ports 29, and adjacent their upper ends outlet ports 30 are provided, it being noted that the upper ends of the pipes are closed aside from the ports 30.

The lowermost short compartment 20 is adapted to communicate with the intermediate long compartment 24 through the medium of a pipe 31, while intermediate short compartment 21 is adapted to have communication with the uppermost long compartment 25 through the medium of a pipe 32. In both instances, the pipes 31 and 32 are connected to the respective compartments adjacent their lower ends and at such points as to maintain a predetermined level of liquid within the compartments. Each short compartment is adapted to have communication with the long compartments therebeneath through a pipe 33 or 34, and such pipe is connected to the respective compartments adjacent their upper ends. The check valves 33ª are interposed in the line of the pipes 31 and 32 to prevent the passage of gas upwardly through the pipe from the compartment 20.

The gaseous material to be treated is adapted to be supplied to the compartment 20 through a pipe 35, and the absorbing agent is adapted to be supplied to the short compartment 22 through a pipe 36. The saturated absorbing agent is ultimately delivered from the tower through a pipe 37 which, as clearly shown in Figure 1, communicates with compartment 23 at a point adjacent its lower end.

The operation of the absorption tower in its adaptation as a recovery apparatus for gasoline vapors is as follows: Natural gas containing gasoline vapor is supplied to the compartment 20 through the pipe 35, and the absorbing agent, such as kerosene, cotton seed oil or the like, is introduced into the compartment 22 through the pipe 36. The gas admitted under pressure to compartment 20, finds its way through the inlet ports 29 of the pipes 26 of the lowermost mixing unit, thus traversing the pipes whence it is admitted to the compartment 23 through the outlet ports 30. Having traversed the compartment 23, the gas finds its way to the compartment 21 through the pipe 33, and from the latter compartment to the compartment 24 through the pipes 26 of the corresponding mixing unit. From the compartment 24 the gas ultimately reaches the compartment 25, where it is discharged from the tank through the pipe 18. During the passage of the gas from the compartment 22 into the pipes 26 of the corresponding mixing unit, the level of the absorbing agent within the compartments 22 is such that the flow of gas into the pipes draws the absorbing agent into the pipes and effects an intermixing of the two. This mixture is discharged from the ports 30 and it impinges in spray form and against the walls of the compartment 25, thereby effecting a further separation of the absorbing agent so as to produce a further intermixing of the gas and absorbing agent. The property of the absorbing agent is such as to retain the gasoline vapors therein so that the liquid collected in the compartment 25 is enriched with gasoline vapor. When this enriched liquid is at the level of the pipe 32, it flows through the latter and downwardly into the compartment 21 so as to provide the necessary absorbing agent for the gas admitted to the compartment 21 and traversing the pipes 26 of the corresponding mixing unit. It will be clear that the gas admitted to the compartment 21 enters the pipes 26 through the ports 29 and operates in conjunction with the absorbing agent in the same manner as described in connection with the compartment 22 so that a further enriching of the absorbing agent is effected. After continued operation, the overflow of the absorbing agent from the compartment 24 flows into the compartment 20 through the pipe 31 where it is again subjected to an intermixing action with the gas entering the compartment 20 to effect a still further enriching of the agent. The agent discharged from the pipes 26 of the lowermost mixing unit is collected in the compartment 23 and ultimately flows from the compartment through the pipe 37. The pipe 37 is in communication with an evaporating still or other suitable apparatus for effecting the subsequent distillation of the absorbing agent to effect recovery of the gasoline vapors.

It will be understood that the natural gas entering the apparatus by pipe 35 is under sufficient pressure to force the absorbent medium in compartment 20 and through opening 29 in the tubes 26, causing the absorbent medium to be delivered through openings 30 at the upper ends of the tubes 26 in the form of a spray, into compartment 23, thereby intimately mixing the gas with the absorbent medium, which will, by gravity, settle down to the bottom of compartment 23. The gas passes from compartment 23 to compartments 21, 22 and 25, where the intimate mixing of the absorbent medium and the gas is repeated in the same manner. It should be noted that the gas cannot pass through pipes 31 or 32 respectively, because of the check valves 33ª and that the level of the absorbent medium in compartments 20, 21 and 22 will not be above the openings 29 of the tubes 26, for the reason that the pressure of the gas will force any liquid above the openings 29 through the tubes 26 into the compartment immediately above.

From the foregoing operation, it will be manifest that with the natural gas successively subjected to the several intermixing operations with the absorbing liquid, the latter is enriched to the point of saturation when it is discharged from the tank through the pipe 37. In the meantime, the natural gas in traversing the several sections is progressively dried so that when it leaves the tank through the pipe 18 it is in a thoroughly dried state, as commercially known. By virtue of the fact that the natural pressure of the gas is employed for intermixing the gas and absorbing agent and for moving the latter from one compartment to the other, it will be clear that no power is required for the operation of the apparatus, while at the same time it is inexpensive and extremely efficient in operation.

I claim:

1. An apparatus of the character described comprising a tank divided internally into a plurality of compartments, means for supplying a gas under pressure to one of the compartments, means for conducting the gas from said compartment successively through the other compartments, means for supplying an absorbing agent to one of the compartments and from the latter to the other compartments, and mixing units in said compartments, each mixing unit comprising a plurality of tubular members extending from one compartment to an adjacent compartment having ports arranged to utilize the pressure of the gas for moving the absorbing agent from the first compartment to the second compartment, and for intermixing the two.

2. An apparatus of the character described, comprising a tank divided internally into a plurality of compartments, means for supplying a gas under pressure to one of the compartments, means for conducting the gas from said compartment successively through the other compartments, means for supplying an absorbing agent to one of the compartments and from the latter to the other compartments, and mixing units in said compartments, each mixing unit comprising a plurality of members extending from one compartment to an adjacent compartment and having ports arranged to utilize the pressure of the gas for moving the absorbing agent from the first compartment to the second compartment, and for intermixing the two.

In testimony whereof I have signed my name to this specification.

DANIEL L. NEWTON.